United States Patent
Wanielik et al.

(10) Patent No.: US 6,239,738 B1
(45) Date of Patent: May 29, 2001

(54) SIGNAL PROCESSING METHOD IN A MOTOR VEHICLE RADAR SYSTEM AND RADAR SYSTEM THEREFOR

(75) Inventors: Gerd Wanielik, Ulm; Robert Schneider, Neu-Ulm, both of (DE)

(73) Assignee: Daimler-Benz Aktiengesellschaft, Stuttgart (DE)

( * ) Notice: Subject to any disclaimer, the term of this patent is extended or adjusted under 35 U.S.C. 154(b) by 0 days.

(21) Appl. No.: 09/101,235

(22) PCT Filed: Dec. 5, 1996

(86) PCT No.: PCT/EP96/05424

§ 371 Date: Jul. 6, 1998

§ 102(e) Date: Jul. 6, 1998

(87) PCT Pub. No.: WO97/25629

PCT Pub. Date: Jul. 17, 1997

(30) Foreign Application Priority Data

Jan. 3, 1996 (DE) .............................. 196 00 059

(51) Int. Cl.$^7$ ...................................................... G01S 13/60
(52) U.S. Cl. .............................. 342/70; 342/99; 342/106; 342/114; 342/115; 342/117
(58) Field of Search ........................ 342/70, 71, 72, 342/90, 99, 106, 109, 114, 115, 117

(56) References Cited

U.S. PATENT DOCUMENTS

| | | | |
|---|---|---|---|
| 4,053,026 | 10/1977 | Fujiki et al. | 180/98 |
| 4,249,176 | * 2/1981 | Oishi et al. | 342/70 |
| 4,308,536 | * 12/1981 | Sims, Jr. et al. | 342/70 |
| 4,916,450 | * 4/1990 | Davis | 342/71 |
| 5,325,097 | * 6/1994 | Zhnag et al. | 342/71 |
| 5,530,447 | * 6/1996 | Henderson et al. | 342/70 |
| 5,612,699 | * 3/1997 | Yamada | 342/70 |
| 5,657,021 | * 8/1997 | Ehsani-Nategh et al. | 342/70 |

FOREIGN PATENT DOCUMENTS

| | | |
|---|---|---|
| 0055420A2 | 12/1981 | (EP) . |
| 0408237A2 | 7/1990 | (EP) . |
| 2 076 610 | * 12/1981 | (GB) . |

OTHER PUBLICATIONS

Schneider, R. et al, "Millimeter Wave Imaging of Traffic Scenarios", Intelligent vehicles Symposium, Proc. IEEE, pp. 327–332, 1996.*

Varga, M. et al, "Automatic car model classification", Int'l Conf. on Acoustics Speech &Sig. Proc., vol. 4, pp. 2369–2372, 1991.*

Roe, H. et al, "Improved discrimination of microwave vehicle profiles", Microwave Symposium Digest, IEEE MTT–S Int'l, vol.2, pp. 717–720, 1992.*

Kees, N. et al, "Road surface classification by using a polarimetric coherent radar module at millimeter waves", Microwave Symposium Digest, IEEE MTT–S Int'l, vol. 3, pp. 1675–1678, 1994.*

Wanielik, G. et al, "Polarimetric millimeter wave imaging radar and traffic scene interpretation", IEEE Colloquium on Automotive Radar and Navigation Techniques (Ref. No. 1998/230), pp. 4/1–4/7, 1998.*

Cheok, K.C. et al, "Moving cluster classification technique with lidar traffic monitoring application", Proc. of the 1998 American Control Conf., vol.2, pp. 944–949, 1998.*

Finkele, R. et al, "Polarimetric road condition classification and data visualisation", IGARSS '95, vol. 3, pp. 1786–1788, 1995.*

(List continued on next page.)

Primary Examiner—John B. Sotomayor
(74) Attorney, Agent, or Firm—Venable; Robert Kinberg; Catherine M. Voorhees

(57) ABSTRACT

A signal-processing method for a motor-vehicle radar arrangement is specified, which method provides more extensive information on the traffic situation in observation direction by evaluating echo signals deflected at the road surface.

10 Claims, 2 Drawing Sheets

OTHER PUBLICATIONS

International Radar Conference, Alexandria, May 8–11, 1995, May 8, 1995, Institute of Electrical and Electronic Engineers, pp. 380–385, XP000529130 Eriksson L H et. al "A High Performance Automotive Radar For Automatic AICC".

Proceedings of the International Conference on Systems Engineering, Fairborn, Aug. 1–3, 1991, Nr. Conf. 3, Aug. 1, 1991, Institute of Elecrical Engineers, pp. 6–12, XP000302895 NOVAK L M: "A Comparison of 1–D and 2–D Algorithms For Radar Target".

* cited by examiner

SIGNAL PROCESSING METHOD IN A MOTOR VEHICLE RADAR SYSTEM AND RADAR SYSTEM THEREFOR

BACKGROUND OF THE INVENTION

The invention relates to a signal-processing method in a motor-vehicle radar arrangement, and a radar arrangement for executing the method.

Radar arrangements in motor vehicles have long been known per se. In the known radar arrangements, the echo signals are particularly used for determining range and velocity with respect to an object located in the direction of travel, for example a vehicle that is traveling ahead or an obstacle. Other motor-vehicle radar arrangements are used with an observation direction that is diagonal or transverse to the direction of travel for determining the verge of the road.

U.S. Pat. No. 4,053,026, for example, discloses a radar arrangement for a motor vehicle, in which a braking procedure is automatically initiated by a logical circuit when a hazardous situation has been ascertained.

Radar-based spacing regulation in motor vehicles is described in Spektrum der Wissenschaft [Science Spectrum], June 1990, pp. 25–34.

SUMMARY OF THE INVENTION

It is the object of the present invention to provide a signal-processing method for a motor-vehicle radar arrangement that produces more comprehensive traffic information, as well as a radar arrangement for executing the method.

The invention is particularly advantageous in monitoring and predicting traffic influences (distances between preceding vehicles, changes due to braking or acceleration, velocities), and in classifying preceding vehicles, the road verge and objects.

In contrast to the prior art cited at the outset, in which diverted signal paths with reflections at walls, the ground, etc., are mentioned as being disadvantageous and confusing, such signal diversions are purposefully and advantageously evaluated in the present invention.

BRIEF DESCRIPTION OF THE DRAWINGS

The invention is described in detail below by way of examples, with reference to the drawings in which.

DETAILED DESCRIPTION OF THE PREFERRED EMBODIMENTS

Figure 1:
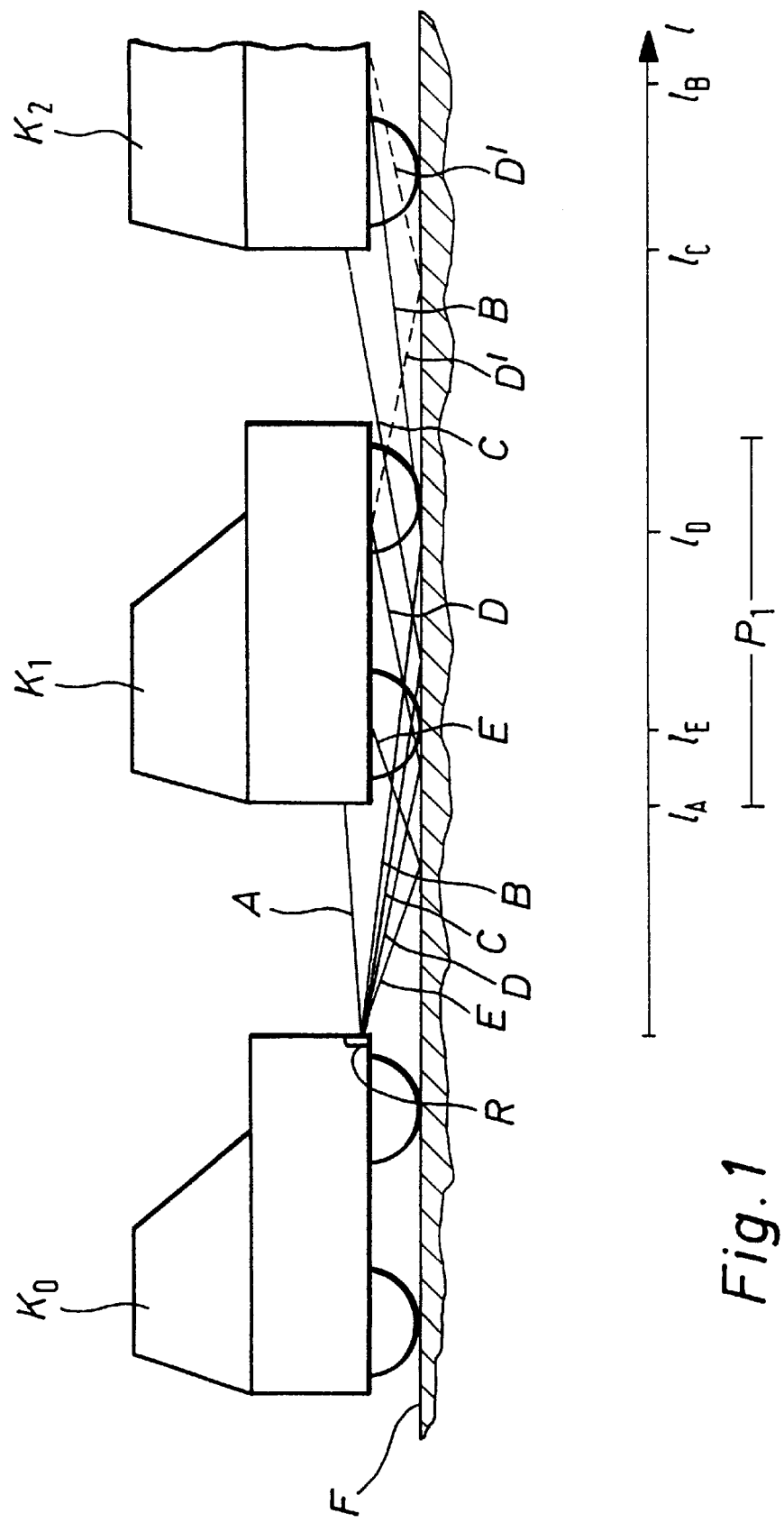
FIG. 1 a multiple-vehicle situation.
Figure 2:
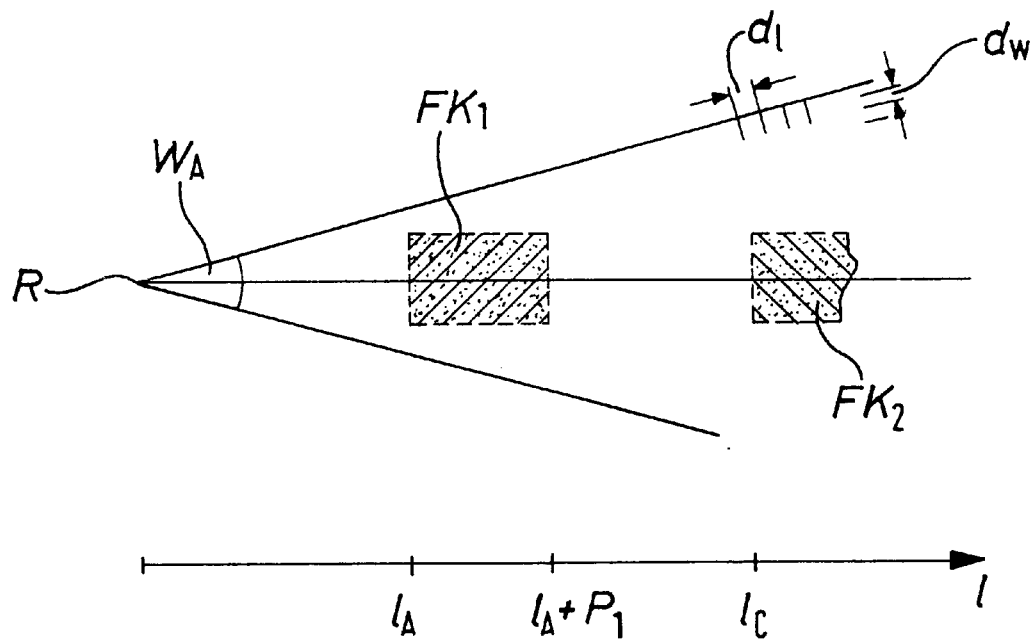
FIG. 2 an image of a traffic situation that can be obtained with the invention, and FIG. 3 an image of another traffic situation.

In the situation outlined in FIG. 1, it is assumed that motor vehicles K0, K1, K2 travel one behind the other with spacing. K0 is equipped with a radar arrangement R, whose monitoring range lies in the direction of travel, and, in the horizontal (azimuth), covers a solid angle WA of, for example, 30 degrees as shown in FIG. 2. For the vertical extension of the monitoring range, according to the invention, it is essential that transmission/reception directions also point in the direction of travel to a sufficient degree. A plurality of bidirectional signal paths is indicated in the drawing as beam lines A, B, C, D, E.

The signal path A represents the basic, typical course for anti-collision radar. The echo signals resulting from this signal path possess a transit time corresponding to a target range $l_A$ of the vehicle K1 from the radar arrangement R. The signal travel path is equal to $2*l_A$.

For the signal paths according to the beam paths B, C, D and E oriented in the direction of the road F, it is assumed, without a limitation of generality, that essentially a specular reflection diversion occurs at a level road F between the radar arrangement R and the reflecting object.

The beam B no longer impacts the rear of the vehicle K1 following directly ahead of K0, and is therefore guided under the vehicle K1, oriented upward due to specular reflection, and impacts the underside of the vehicle K2 at a range $l^B$ from the radar arrangement. Echo signals reflected there can travel back to the radar arrangement R along the same path B, in the opposite direction of propagation. Analogously, signals travel along the path C to the rear of K2 and back.

The signals on the paths D and E are already partially reflected at the underside of the vehicle K1.

Because of the flat angle of incidence, the signal-travel lengths on the diverted signal paths B, C, D, E can be equated, with a negligible error, with the horizontal ranges according to the range scale l. Thus, in the radar arrangement of the invention, echo signals having a longer transit time are received and evaluated after the signals from path A within a radar period, with the signals A having the shortest transit time corresponding to a target range $l^A$. From the signal path A above E and D, including intermediate values, a basically continually-increasing target range of up to $(l_A+D1)$ is evident as long as a reflection occurs from the underside of K1. In contrast, the signal path C leading just below K1 exhibits a distinct jump in transit time, and in turn initiates a segment with a basically continually-increasing target range, provided that a reflection occurs at K2. In addition to the signal paths shown in solid lines, signal paths having multiple diversions are also significant. This is indicated for a signal path from the radar arrangement R on the path D to the road, and to the underside of the vehicle K1. Here a portion of the output of the radar arrangement is reflected back, while another portion of the output is diverted again to the road F on the signal path D', and is diverted there to the vehicle K2. The signal path D+D' thus contributes to the echo signal of K2. Other multiple diversions are possible. Because of the flat angle between the path of propagation and the road, the signal path is of less significance for the details of the evaluation.

FIG. 2 shows a representation of target messages for the situation of FIG. 1 in an azimuth/range representation that is typical for radar, with the assumption of an azimuth angle resolution of, for example, $\leq 1$ degree per angle segment dw, and a range resolution of $dl \leq 1$ m. The elevation resolution is of less significance for the function of the invention, and may be reduced (for example 3°). An elevational angle resolution can be provided, but is not absolutely necessary for the basic function of the invention.

The target messages form surfaces FK1, FK2, whose outline essentially matches that of the undersides of the preceding vehicles K1 and K2; in the position, the surfaces essentially correspond to the distance between the vehicles and the radar arrangement R.

According to the invention, the evaluation of the echo signals permits a determination of the parameters of these surfaces, particularly the vehicle length and/or the mutual distance between preceding vehicles, from the gaps between successive surfaces. This in turn permits, for example, the distinction of whether signals with a lengthy transit time originate from a vehicle or another object. A target classification according to vehicle types, particularly a distinction between motorcycles, passenger cars and trucks of different sizes, and/or according to vehicles with and without trailers, can be performed from the surface parameters, for example length, width, shape, and mutual surface distance. The evaluation can be based solely on the vehicle length, or can include a surface evaluation in the manner of an image analysis. Methods of image analysis and object classification that can be adapted for the application of the present invention are known in principle, and are therefore not discussed in detail here. A statement about braking or acceleration situations can be derived from the change in distance between preceding vehicles. Velocities of preceding vehicles can additionally be determined with a Doppler evaluation of the echo signals. Furthermore, information about the relationship between object reflections can also be derived from the Doppler analysis.

Figure 3:
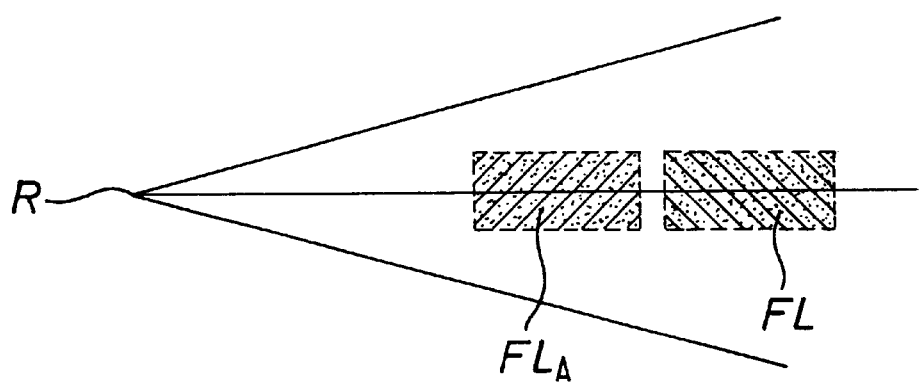

FIG. 3 shows an azimuth/range representation with target surfaces FL, FLA for a situation that involves a preceding truck towing a trailer.

The invention is particularly advantageous for so-called convoy transport traffic. Another advantage is the possibility of deriving consequences for individual driving behavior, particularly in terms of safety, from the mutual distance between preceding vehicles and, possibly, the change in this distance over time.

An angle resolution of the radar arrangement in the vertical direction is possible, but, as stated above, not absolutely necessary, for the evaluation. An additional recognition of the signal diversion at the road through vertical angle discrimination can support the distinction between directly-observed targets and targets observed through road specular reflection.

Radar arrangements that are suitable for use with the invention are known per se. In particular, conventional anti-collision radar arrangements can also be retrofitted at low cost. The radar arrangement is preferably embodied as a pulse-radar arrangement, or as an FMCW radar arrangement, particularly with Doppler-processing capability for echo signals. A crucial difference between this radar arrangement and known arrangements is that the receiver devices of the present radar arrangement do not only receive and evaluate the echo signal with the shortest echo transit time within a radar period, but also subsequent echo signals, and that the antenna arrangement includes a signal-propagation path that is directed at the road. The signal paths directed at the road should particularly lie within an angle range between 0 and 10 degrees from the horizontal. The entire elevationally-monitored solid-angle range advantageously extends from, for example, +10 to −10 degrees with respect to the horizontal. The range resolution is preferably <1 m. The mounting height of the radar arrangement R above the road F is advantageously <1 m. The evaluation is possible for one skilled in the art with digital signal-processing means, based on the aforementioned embodiments, particularly with the use of programmable processors with peripheral modules.

What is claimed is:

1. A signal processing method in a motor-vehicle radar arrangement, comprising the following steps:

emitting radar signals in the direction of motor-vehicle travel, said radar signals reflecting at least one of a road surface and a reflecting target adjacent the road surface resulting in echo signals; and evaluating echo signals which correspond to a signal path with a diversion at the road surface between the radar arrangement and the reflecting target adjacent the road surface;

wherein at least one of a signal emission or signal reception is performed selectively into the road surface or from the road surface, respectively.

2. The method according to claim 1, in wherein echo signals having a longer transit time than the echo signal having the shortest transit time are also evaluated within a solid-angle range encompassing a direction of the road.

3. The method according to claim 1, wherein the echo signals are subjected to a classification with at least one vehicle class.

4. The method according to claim 1, wherein the echo signals are subjected to an image-analysis procedure.

5. The method according to claim 3, wherein at least one of the vehicle length and the vehicle surface is evaluated as a classification feature.

6. The method according to claim 3, wherein the orientation of the vehicles on the road is detected.

7. The method according to claim 1, wherein at least one of the distance between vehicles located in the observation direction and their velocities are determined.

8. The method according to claim 1, wherein the observation range for evaluating the echo signals from signal paths with a diversion at the road surface is reduced to at least one of an azimuth and an elevational cutout angle in the direction of travel.

9. The method according to claim 4, wherein the vehicle length is evaluated as a classification feature.

10. The method according to claim 4, wherein the vehicle surface is evaluated as a classification feature.

* * * * *